(12) United States Patent
Yamano et al.

(10) Patent No.: US 7,495,604 B2
(45) Date of Patent: Feb. 24, 2009

(54) ELECTRONIC SCANNING RADAR APPARATUS

(75) Inventors: Chiharu Yamano, Tokyo (JP); Kazuma Natsume, Kariya (JP); Yuu Watanabe, Kariya (JP); Mai Sakamoto, Kariya (JP)

(73) Assignee: Denso Corporation (JP)

( * ) Notice: Subject to any disclaimer, the term of this patent is extended or adjusted under 35 U.S.C. 154(b) by 183 days.

(21) Appl. No.: 11/676,741

(22) Filed: Feb. 20, 2007

(65) Prior Publication Data

US 2008/0036645 A1 Feb. 14, 2008

(30) Foreign Application Priority Data

Feb. 27, 2006 (JP) ............................. 2006-050682

(51) Int. Cl.
*G01S 13/58* (2006.01)
(52) U.S. Cl. .................. 342/107; 342/109; 342/70; 342/111; 342/129; 342/133; 342/146; 342/147; 342/192
(58) Field of Classification Search ............. 342/70–72, 342/98–102, 107, 11, 113, 115, 116, 128, 342/129, 133–135, 139, 146, 147, 156–158, 342/192, 194–196
See application file for complete search history.

(56) References Cited

U.S. PATENT DOCUMENTS

2004/0183719 A1* 9/2004 Natsume et al. ............. 342/147

FOREIGN PATENT DOCUMENTS

JP 11-231040 8/1999

OTHER PUBLICATIONS

Nobuo Kikuma: "Adaptive Signal Processing by Array Antenna" (Japan, 1998).
Tim J. Nohara: "Adaptive Mainbeam Jamming Suppression For Multi-Function Radars," Sicom Systems Ltd., Ontario, Canada. (Presented at the IEEE 1998 National Radar Conference, Daias, TX, May 12-13, 1998).

* cited by examiner

Primary Examiner—Thomas H Tarcza
Assistant Examiner—Timothy A Brainard
(74) Attorney, Agent, or Firm—Robert F. Zielinski; Buchanan Ingersoll & Rooney PC

(57) ABSTRACT

A sampled beat signal is cut out into two or more short time data in a time direction concerning each antenna component. From a frequency spectrum of the short time data, an interference element frequency of an interference wave is detected. From the interference element frequency of the interference wave, two or more candidates of the frequency before aliasing of the interference wave are produced, and phase correction is executed on each candidate. Digital Beamforming is executed on the corrected frequency so as to extract maximum peaks of the power of an azimuth direction, and the frequency candidate showing the maximum peak power is selected and the arrival azimuth of the interference element is estimated. A filter for suppressing the interference element is applied on the short time data from the estimated arrival azimuth of the interference element so as to suppress the interference element.

3 Claims, 13 Drawing Sheets

(a)

(b)

(c)

ELECTRONIC SCANNING RADAR APPARATUS

This application claims benefit of priority to Japanese Patent Application No. 2006-50682 filed on Feb. 27, 2006.

BACKGROUND OF THE INVENTION

This invention relates to an electronic scanning radar apparatus, and especially to an electronic scanning radar apparatus for detecting an azimuth of an interference signal included in a received signal and for suppressing of the interference signal in a FM-CW type or a CW type of electronic scanning radar apparatus for use on vehicle.

FIG. 1 is a time-chart showing transmitted signals and received signals and a principle of mixing in a FM-CW radar, FIG. 2 is a top view showing an instance of a road a environment having opposed lanes, FIG. 3 is a view showing signal processing in one's own vehicle in a conventional radar apparatus when receiving an interference signal from another vehicle, FIG. 4 is a view showing sampling values of respective channels and states of interference element signals which are supposed at this time (signals before and after aliasing) in a case of simultaneous reception with all channels and a case of time division (switching) reception.

On-vehicle radars for measuring distance, speed and azimuth with respect to a preceding target which exists in a forward direction have been developed in order to control a automotive vehicle crash prevention and tracking traveling.

A FM-CW radar system is used for measuring distance and relative speed with respect to a preceding target because of a simple structure of a signal processing circuit. As shown in FIG. 1(*a*), a signal s1 which frequency is linearly changed is transmitted from a transmission antenna. The signal S1 which is reflected by a target is received as a signal S2, and the received signal S2 and the transmitted signal S1 are mixed with each other as shown in FIG. 1(*b*), thereby generating a beat signal S3 which component is a frequency difference between the received signal and the transmitted signal (beat frequency fb). This beat frequency is proportional to a reciprocating propagation delay time Δt from a target, and distance can be computed therefrom.

When measuring azimuth, an electronic scanning system for scanning all azimuths in a short time is employed. In the electronic scanning system, a reflected wave from a target is received by a plurality of antenna elements (array antenna) which are arranged according to some rule. And, a time difference occurs which is determined by the azimuth of the target with respect to each antenna, a position where each antenna is arranged and the frequency of the received signal between channels of the received data. The azimuth of the target can be detected by this time difference (or difference of phases). As such kind of method, Digital Beamforming (DBF) is known. In DBF, the azimuth can be detected in such a manner that the received data is converted into digital data with an AD converter, and thereafter a correlation between each channel and vector data (mode vector) is taken (see document "Adaptive signal processing by array antenna" which has been published on 1998 by Kagaku Gijyutsu Shuppan written by Nobuo KIKUMA, which is referred to as "reference 1" hereinafter).

As mentioned before, simultaneously received data by a plurality of antenna elements are necessary in the electronic scanning system. But, in such a structure that the AD converter is prepared for each antenna element, the whole machine is made complex and expensive. Then, the structure as shown in FIG. 5 having a switcher 7 arranged between each antenna element 6 and an AD converter 13 in order to receive in divided time has been proposed. (see Japanese patent application publication number of which is H11-231040).

In such a reception system with time division, delay time τ[k] (wherein k denotes a channel number) owing to switching occurs at each channel. If this delay time τ[k] owing to switching is small enough to neglect with respect to a cycle 1/fb of a beat frequency fb (τ[k]<<1/fb), it is possible to process by regarding as simultaneous reception at all channels. But, it is impossible to neglect the delay time since relatively low speed switcher (wherein driving frequency of VC02 is relatively low) may be used because of cost problem. If an error between the phases of received signals in each channel is big, the azimuth of an object (target) can not be correctly detected, so that it is preferable to correct phase Δφ[k] which is represented by Expression 1 in each channel.

[Expression 1]

$$\Delta\phi[k]=2\cdot\pi\cdot f_B\cdot\tau[k] \quad (1)$$

It is thus possible to correctly detect the azimuth with this phase correction even in the case of time division reception. Under a road environment wherein many vehicles each having the on-vehicle radar apparatus come and go, as shown in FIG. 2 for instance, a radio wave Rx2 from the radar which is on the vehicle traveling on an opposite lane may be mixed into the radar of one's own vehicle. In such a case, an interference occurs between reflected wave Rx1 of radio wave Tx which is radiated from one's own vehicle for a target and radio wave Rx2 from the opponent vehicle. Especially, direct wave from a transmission antenna of another vehicle widely influences measurement accuracy since the direct wave is relatively big in its power level.

Under such a situation, it is effective to suppress interference elements included in the received signal. For instance, a method of suppressing interference elements with a filter for suppressing elements from a specific azimuth has been proposed (see document "Adaptive Mainbeam Jamming Suppression for Multi-Function Radars written by T. J. Nohara and others).

In the above-mentioned radar with time division switching, the azimuth of the interference signal Rx2 element from another vehicle may not be properly obtained. Reasons are as follows.

If a system of modulating the interference signal Rx2 element from another vehicle is the FM-CW system or the CW system as shown in FIG. 3(*a*), the interference element of the signal Rx2 after mixing is a continuous signal wherein frequency fluctuates as shown in FIG. 3(*b*). When executing sampling with the AD converter thereafter, the beat frequencies exceeding a half of a sampling frequency F (so-called Nyquist frequency) appear as folded elements as shown in FIG. 3(*c*).

If the frequency thus fluctuates with time, it is difficult to determine the amount of phase correction of the received signal at each channel and to correct the phase in the channel switching system for switching two or more antenna elements with the switcher. If an inclination of the FM-CW modulation is almost parallel, the frequency of the interference element relatively gently fluctuates. But, the frequency may be folded. In such a case, it is difficult to uniformly determine the amount of the phase correction. FIG. 4 shows an instance wherein the amount of phase shift is different due to the frequency before aliasing even if the data after sampling are the same. In a case of reception with switching (switching delay time τ) of FIG. 4(*b*), a line shown with a dotted line shows signal before aliasing BS, and a lien shown with a full line is a signal after aliasing AS. From the figure, it is understood that the necessary amount of the phase correction on the value of sampling is widely different in respective signals BS and AS since the cycles of the respective signals BS, AS are different.

Due to the above-mentioned reasons, it is difficult to properly obtain the azimuth of the interference element in the FM-CW system of the CW system of the electronic scanning radar with time division reception. Therefore, a problem is that it is difficult to apply the interference suppressing with directivity.

Then, an object of the invention is to provide an electronic scanning radar apparatus for suppressing an interference making use of directivity even in the FM-CW system or the CW system of the electronic scanning radar with time division reception in order to resolve the above-mentioned problems.

SUMMARY OF THE INVENTION

Figure 1:
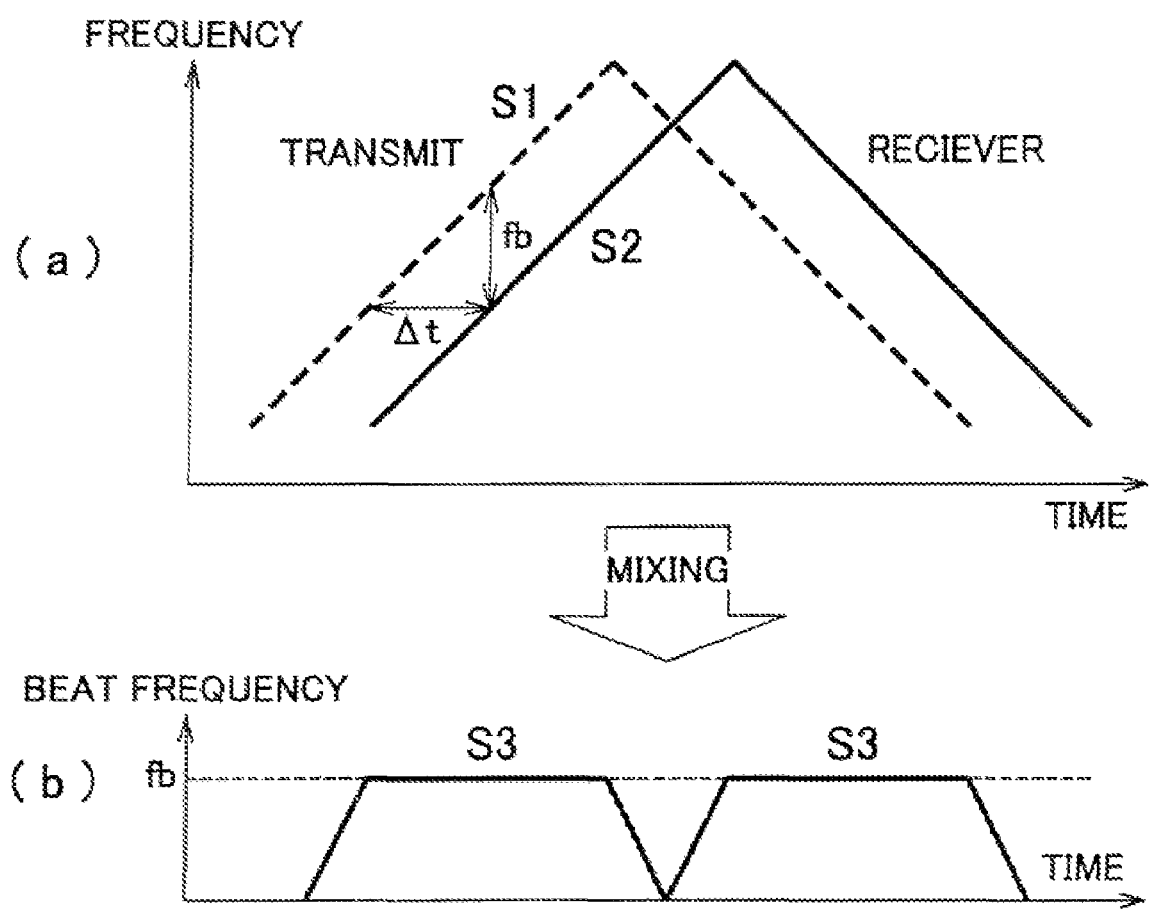
FIG. 1 is a time-chart showing transmitted signals and received signals in a FM-CW radar system and a principle of mixing thereof.
Figure 2:
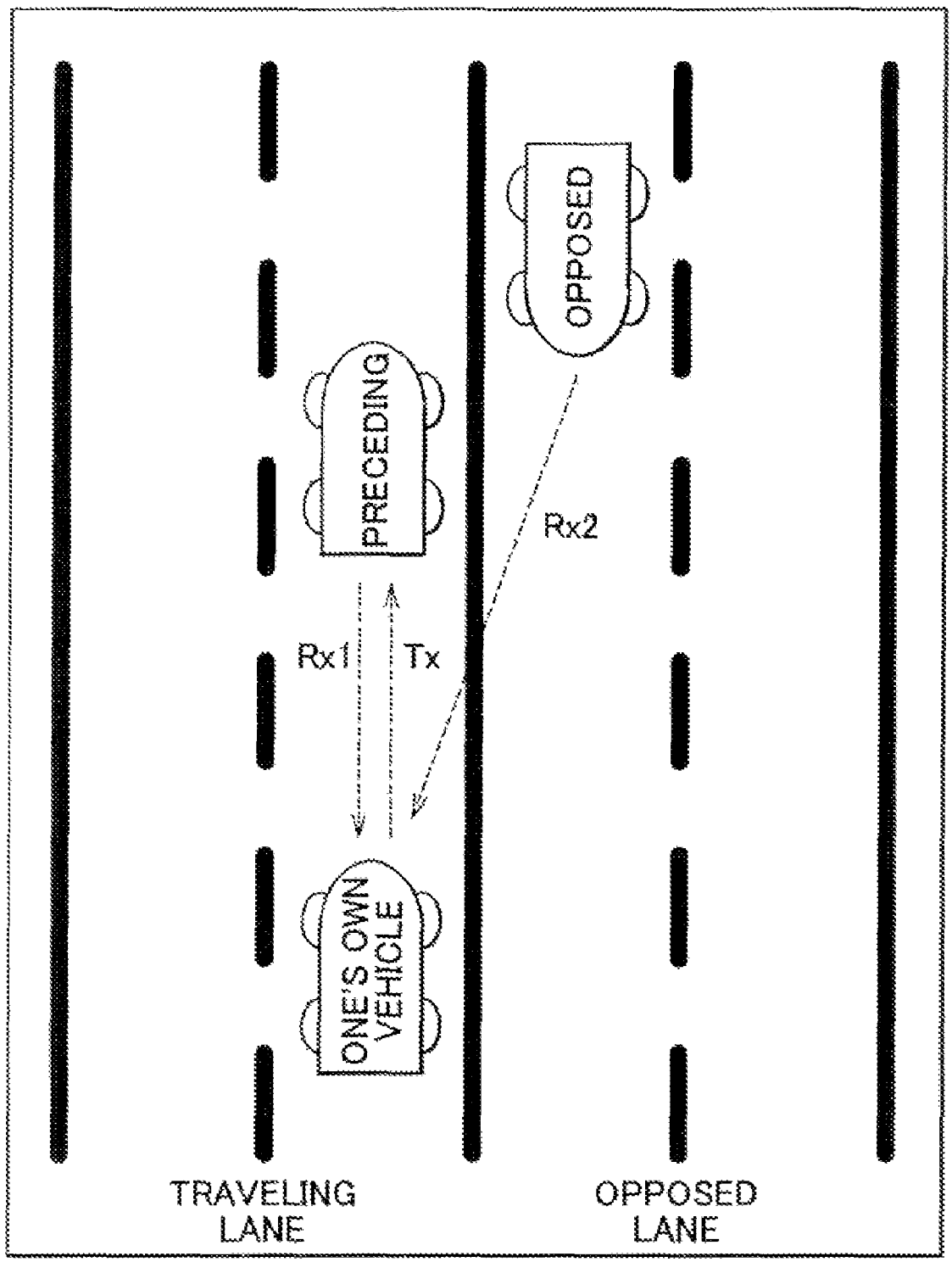
FIG. 2 is a top view showing an instance of a road environment having opposed lanes.
Figure 3:
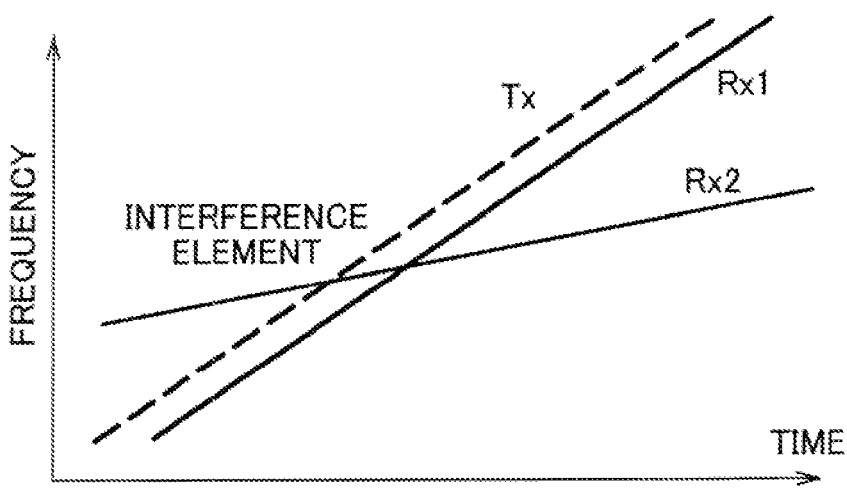
FIG. 3 is a view showing signal processing in one's own vehicle in a conventional radar apparatus when receiving an interference signal from another vehicle.
Figure 3:
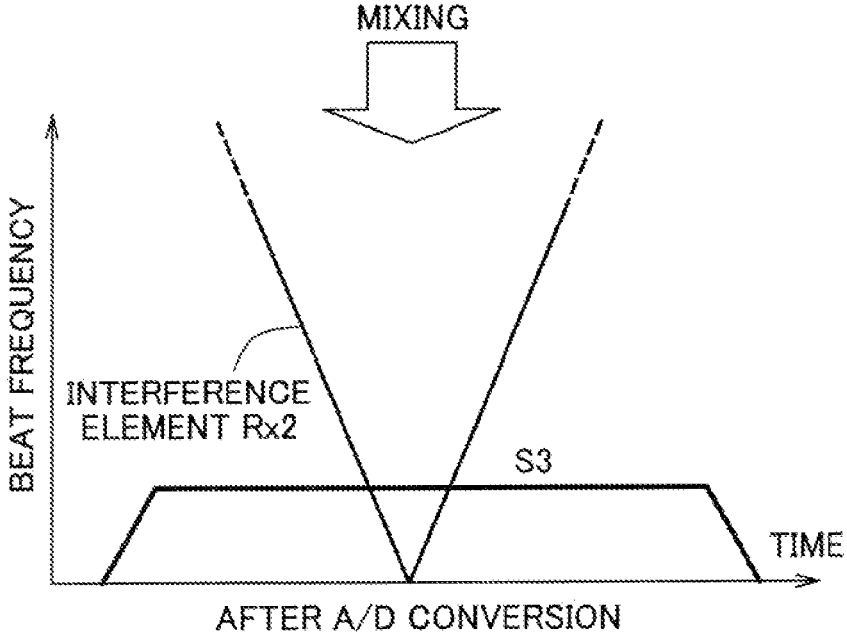
Figure 3:
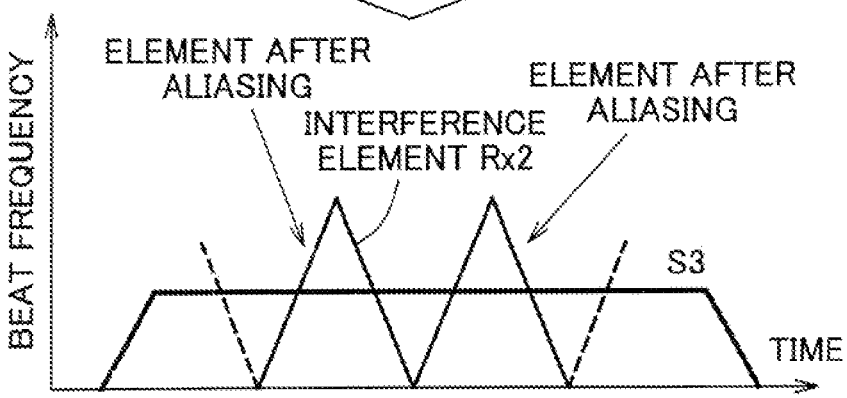
Figure 4:
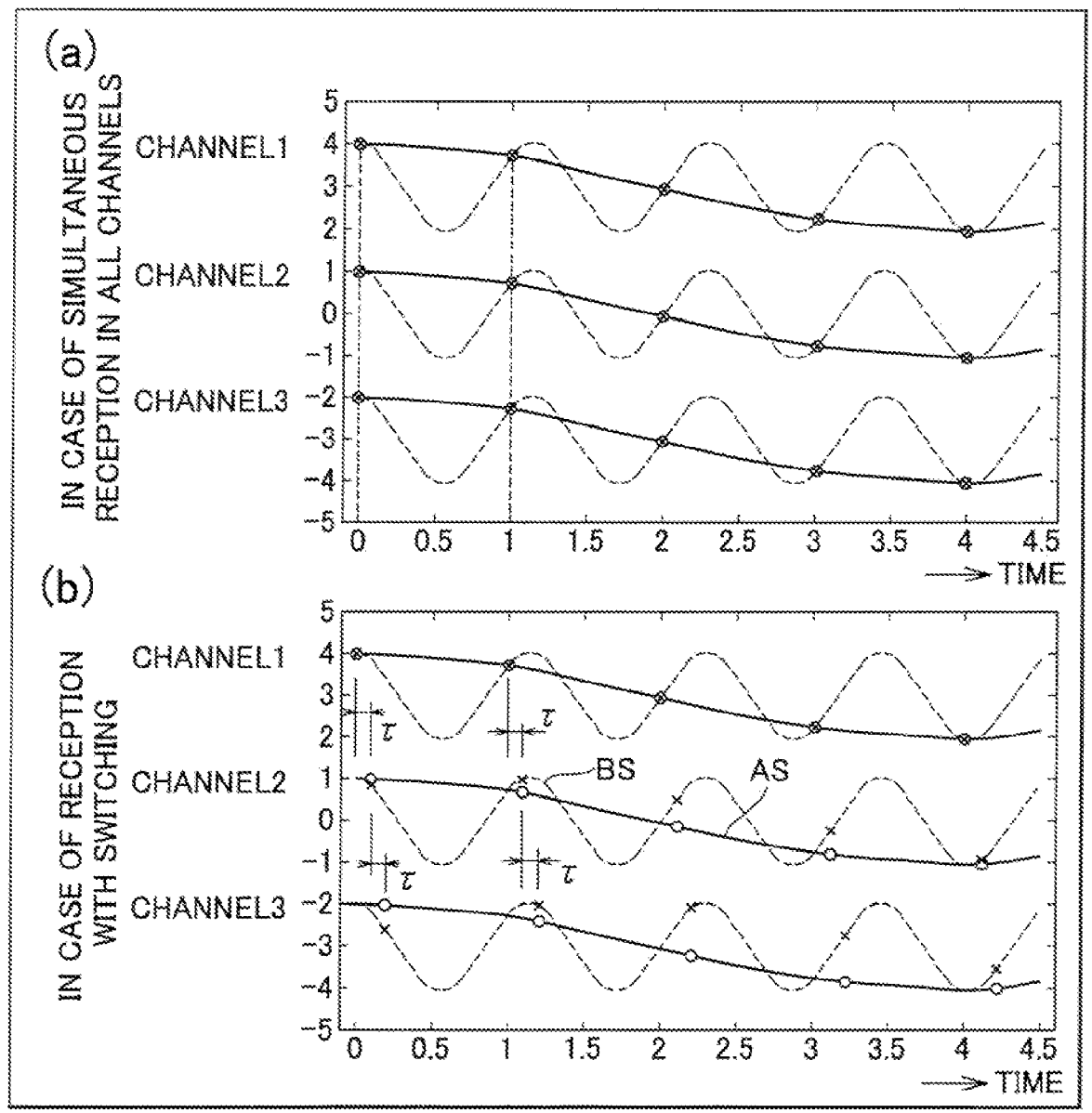
FIG. 4 is a view showing sampling values of respective channels and states of interference element signals which are supposed at this time (signals before and after aliasing) in a case of simultaneous reception with all channels and a caser of time division (switching) reception.

One aspect of the invention is electronic scanning radar apparatus, having
  a transmission antenna for ejecting a transmitted signal which is comprised of a continuous wave;
  a reception antenna which is comprised of two or more antenna components;
  a mixer for mixing a received signal received by each of said two or more antenna components and said transmitted signal and for obtaining beat signals for two or more channels corresponding to said two or more antenna components;
  a switcher provided between said mixer and said two or more antenna components, for selectively connecting said two or more antenna components with said mixer;
  an A/D converter for sampling said beat signal obtained by said mixer with a predetermined sampling frequency and for obtaining received data respectively corresponding to said two or more antenna components for two or more channels; and
  a target detector for detecting distance and relative speed of a target on the basis of said receiving data for said two or more channels which is sampled by said A/D converter, said electronic scanning radar apparatus, comprising:
    a short time data cutting for cutting said sampled received data for two or more channels into two or more short time data in a time direction for each channel;
    a frequency spectrum computing portion for computing frequency spectra of said two or more short time data for each said channel;
    an interference frequency detector for detecting an interference element frequency of an interference wave from said frequency spectra;
    two or more phase correctors, each corrector for producing two or more candidates of a frequency before aliasing of said interference wave from said interference element frequency of said interference wave, and for computing phase correcting amount for each candidate, and for correcting phase on said interference element frequency on the basis of said phase correcting amount;
    two or more maximum peak direction extractors, each extractor for executing Digital Beamforming processing on said interference element frequency after respective phase corrections, and for extracting the maximum peak in an electric power of an azimuth direction on said each frequency candidate;
    an interference direction selector for selecting said frequency candidate showing the maximum peak power of the maximum peaks of said respective frequency candidates, and for estimating an arrival azimuth of said interference element from said azimuth of said maximum peak power of said selected frequency candidate;
    an interference direction element remover for applying a filter for suppressing said interference element to said short time data cut out by said short time data cutting in said estimated arrival azimuth of said interference element so as to suppress said interference element; and
    a buffer for merging said short time data wherein said interference element has been suppressed and for restoring to data having length before cutting;

whereby distance and relative speed of said target are detected on the basis of said restored data.

According to this aspect of the invention, although the interference element frequency fluctuates with time when receiving FM-CW radar or CW radar from an opponent vehicle as interference radar, the interference radar is cut out into the short time data in the structure of this embodiment, so that the frequency does not almost change in the cut-time bounds, and for this reason, the frequency spectrum computing portion and the interference frequency detector can detect the interference element frequency in the time section. Then, suppressing of the interference is possible, making use of directivity even in the FM-CW system or the CW system of the electronic scanning radar with time division reception.

Besides, the interference azimuth can be properly detected on the frequency after aliasing since in this structure, all possible frequencies before aliasing are considered out of the frequencies after aliasing, and "phase correction" and "DBF" are executed thereon, and the maximum peaks (P1 through P4) are extracted, and the probable azimuth is selected out of two or more possible candidates so as to determine the interference direction.

Another aspect of the invention is the electronic scanning radar apparatus, having
- a transmission antenna for ejecting a transmitted signal which is comprised of a continuous wave;
- a reception antenna which is comprised of two or more antenna components;
- a mixer for mixing a received signal received by each of said two or more antenna components and said transmitted signal and for obtaining beat signals for two or more channels corresponding to said two or more antenna components;
- a switcher provided between said mixer and said two or more antenna components, for selectively connecting said two or more antenna components with said mixer;
- an A/D converter for sampling said beat signal obtained by said mixer with a predetermined sampling frequency and for obtaining received data respectively corresponding to said two or more antenna components for two or more channels; and
- a target detector for detecting distance and relative speed of a target on the basis of said receiving data for said two or more channels which is sampled by said A/D converter, said electronic scanning radar apparatus, comprising:
- a short time data cutting for cutting said sampled received data for two or more channels into two or more short time data in a time direction for each channel;
- a frequency spectrum computing portion for computing frequency spectra of said two or more short time data for each said channel;
- an interference frequency detector for detecting an interference element frequency of an interference wave from said frequency spectra;
- two or more phase correctors, each corrector for producing two or more candidates of a frequency before aliasing of said interference wave from said interference element frequency of said interference wave, and for computing phase correcting amount for each candidate, and for correcting phase on said interference element frequency on the basis of said phase correcting amount;
- two or more maximum peak direction extractors, each extractor for executing Digital Beamforming processing on said interference element frequency after respective phase corrections, and for extracting the maximum peak in an electric power of an azimuth direction on said each frequency candidate;
- an interference direction selecter for selecting said frequency candidate showing the maximum peak power of the maximum peaks of said respective frequency candidates, and for estimating an arrival azimuth of said interference element from said azimuth of said maximum peak power of said selected frequency candidate;
- a memory for storing in advance two or more transition patterns of said beat frequency of said interference element which may occur at the time of mixing with said interference wave in said mixer;
- a filter for correcting frequency before aliasing, for comparing said frequency before aliasing of said interference wave estimated by said interference direction selecter and said two or more transition patterns in said memory so as to judge to which transition pattern of these transition patterns said estimated frequency before aliasing of said interference wave can be applied and for selecting the pattern, and correcting an estimated result of said frequency before aliasing of said interference wave on the basis of said selected transition pattern, and for outputting said result; and
- an interference direction element remover for applying a filter for suppressing said interference element to said sampled received data for said two or more channels on the basis of said arrival azimuth of said estimated interference element and said estimated result of said corrected frequency before aliasing of said interference wave outputted from said transition correcting filter so as to suppress said interference element of said received data.

According to this aspect of the invention, even if there is an error in the beat frequency before aliasing due to fluctuations, such as noise, a transition pattern corresponding to the frequency before aliasing is selected from the estimated frequencies before aliasing by applying two or more transition patterns as the candidates of the frequency before aliasing, and parts which does not applied to the selected transition pattern are corrected, thereby improving the accuracy of detecting the azimuth on a weak interference element which is easy to receive influence of fluctuations of noise, and removing the weak interference element.

Another aspect of the invention is the electronic scanning radar apparatus, further comprising a signal suppressing amount map producer for computing and outputting lowered amount of said beat signal excluding said interference element suppressed by said filter in said interference direction element remover on the basis of said arrival azimuth of said interference element estimated by said interference direction selecter as a signal suppressing amount map.

According to this aspect of the invention, in this structure, the signal suppressing amount map is produced and outputted in order to grasp the amount of the signal suppression on the original received signal Rx which suppression should be executed contingent to the suppressing of the interference signal element, so that this map can be utilized (corrected) in the latter tracking. That is, a degree of lowering of the signal contingent to the remove of the interference element can be grasped and corrected by the target tracker in the latter step, so that the target can bet tracked without lost thereof even if there is an opposition by the interference elements.

DESCRIPTION OF THE PREFERRED EMBODIMENTS

Embodiments of the invention will now be explained, referring to appended drawings.

Figure 5:
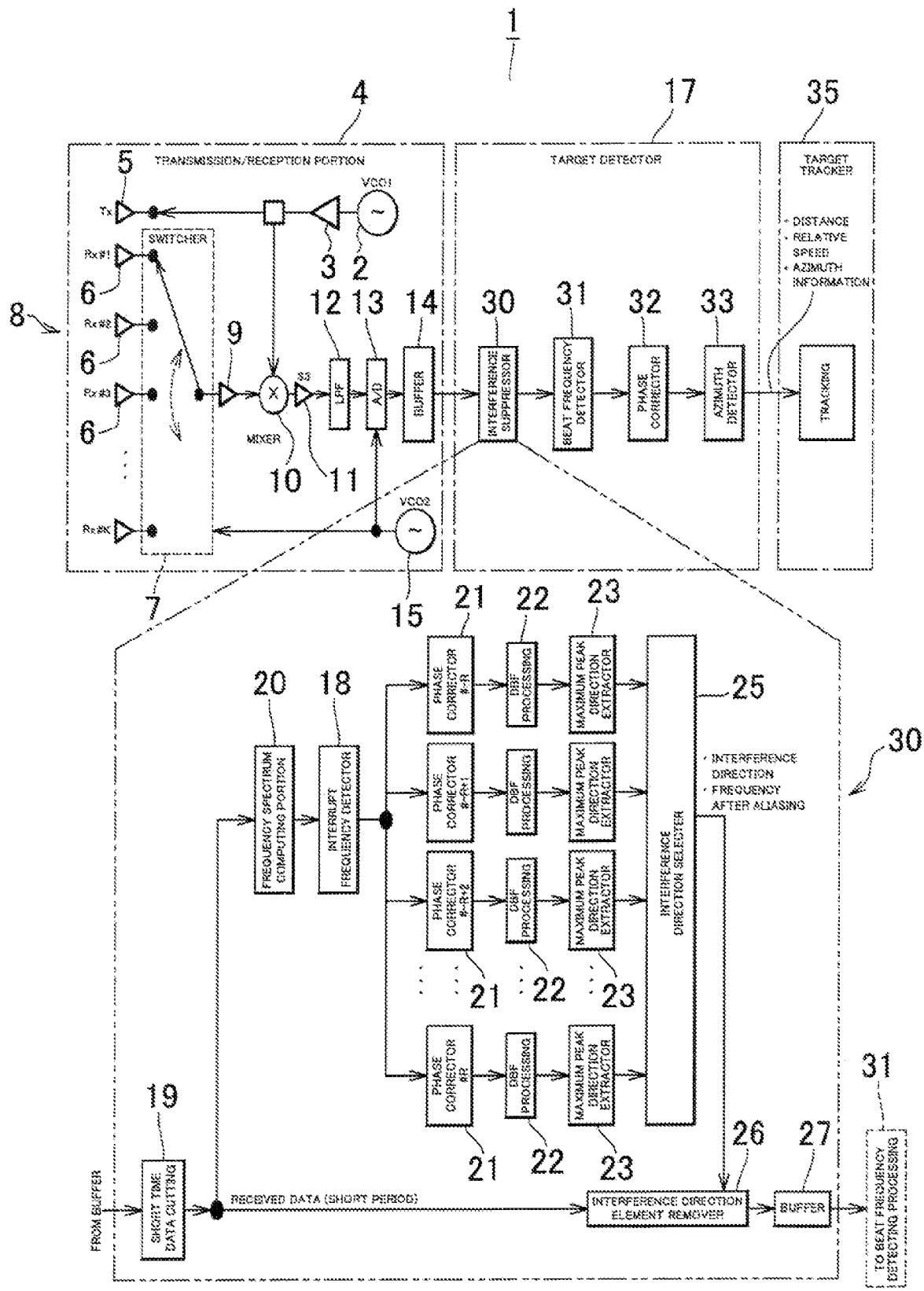
FIG. 5 is a block diagram showing one embodiment of the electronic scanning radar apparatus according to the invention.
Figure 6:
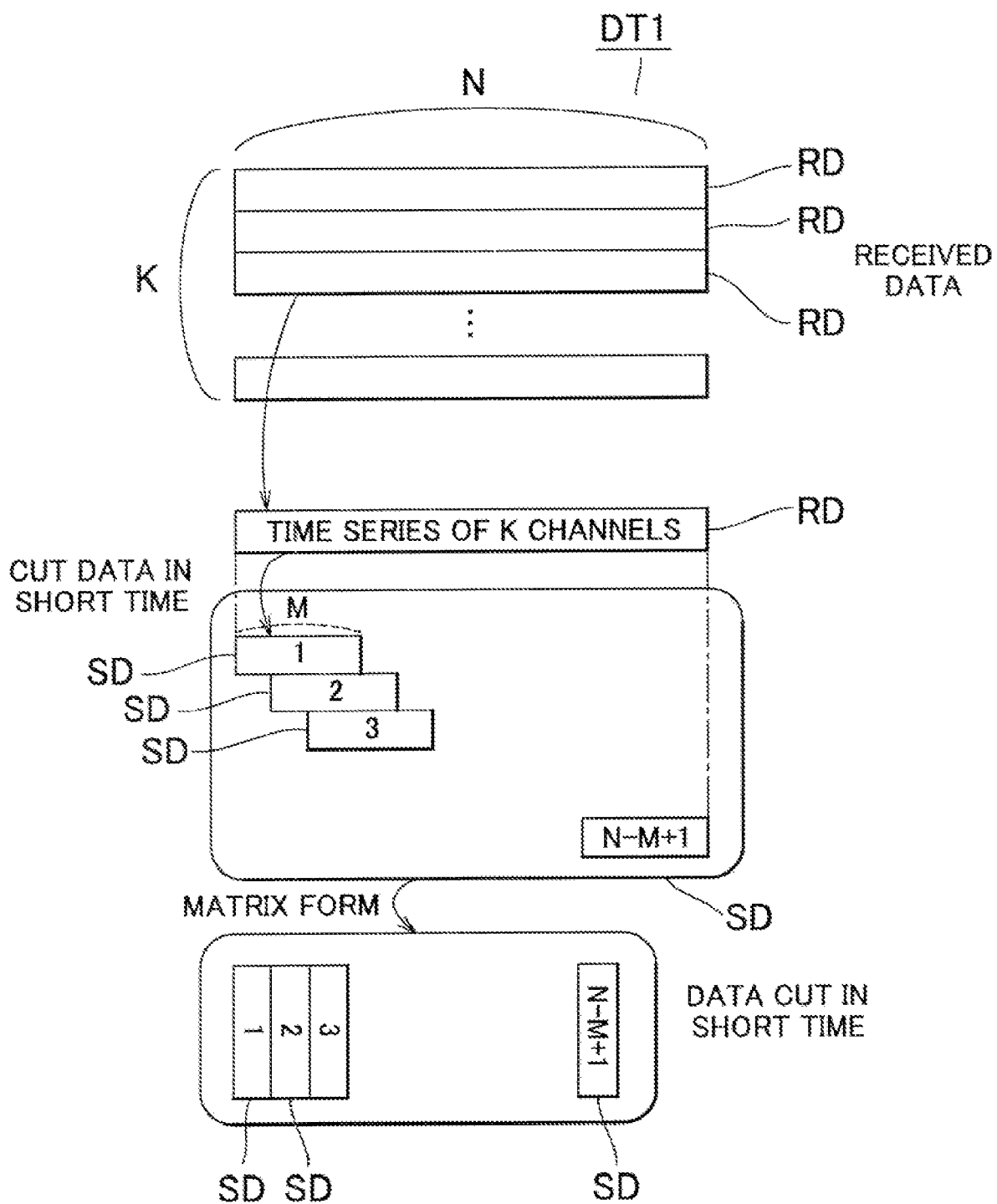
FIG. 6 is a typical view showing cutting of short time data.
Figure 7:
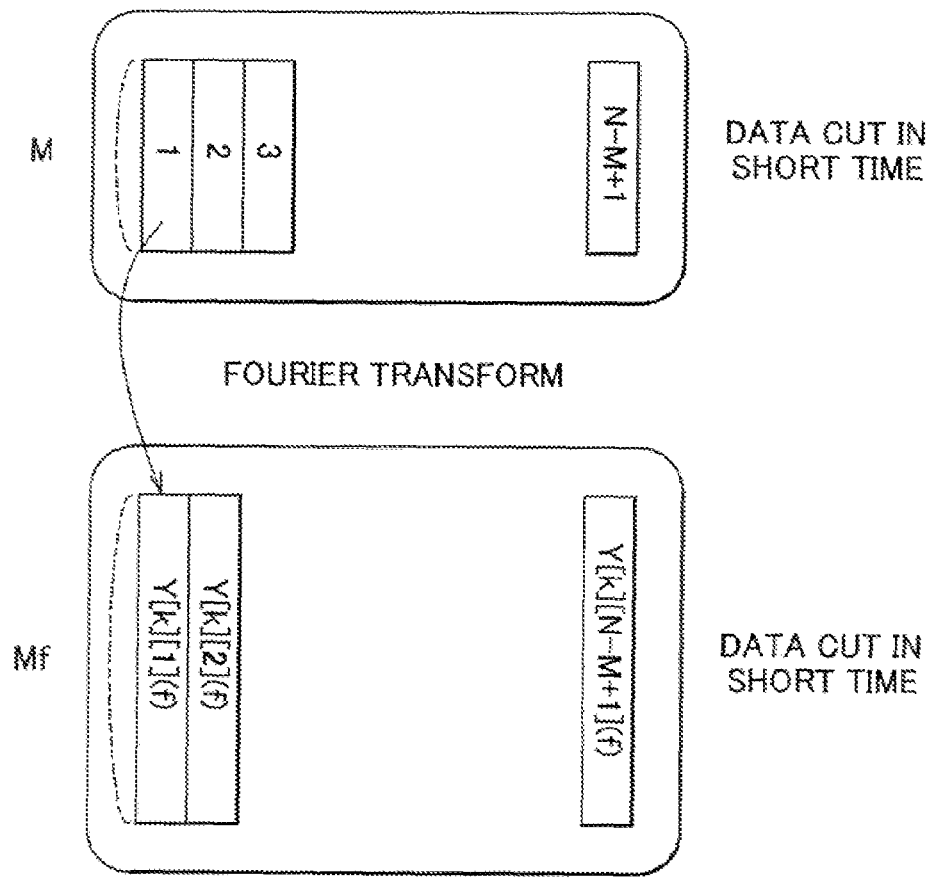
FIG. 7 is a typical view showing computing of a frequency spectrum.
Figure 8:
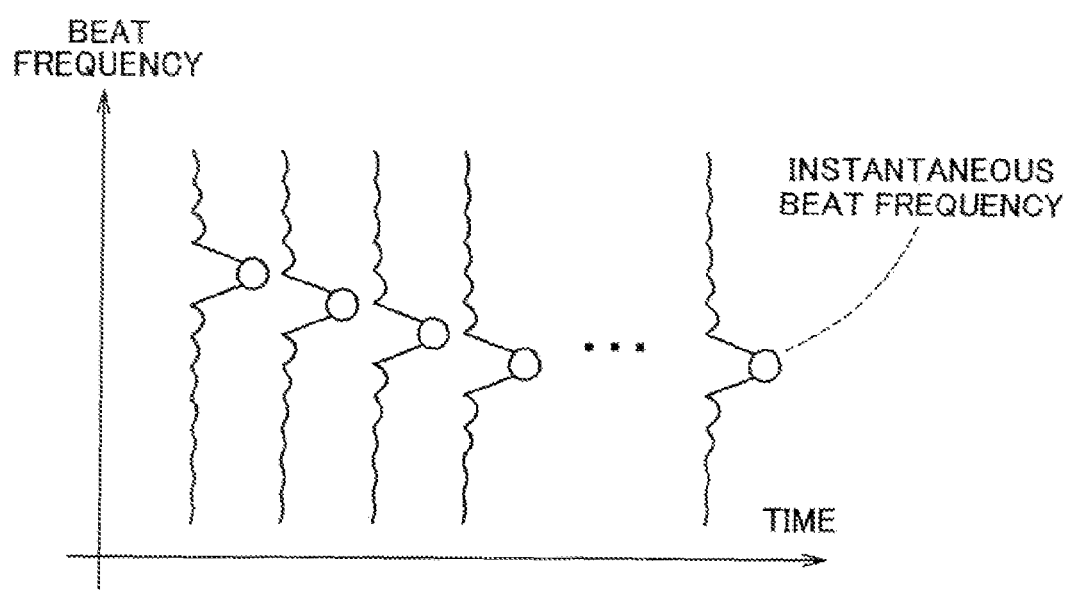
FIG. 8 is a typical view showing an instantaneous beat frequency of an interference signal in each time.
Figure 9:
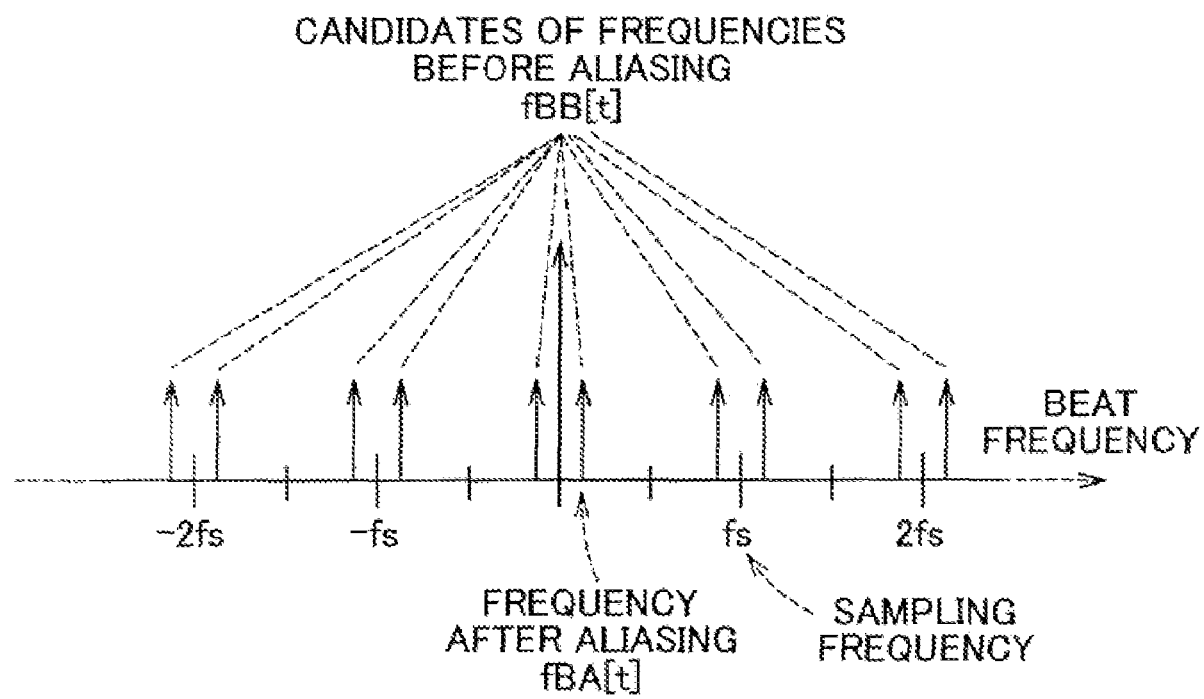
FIG. 9 is a typical view showing frequency candidates before aliasing which is generated from the instantaneous beat frequency.
Figure 10:
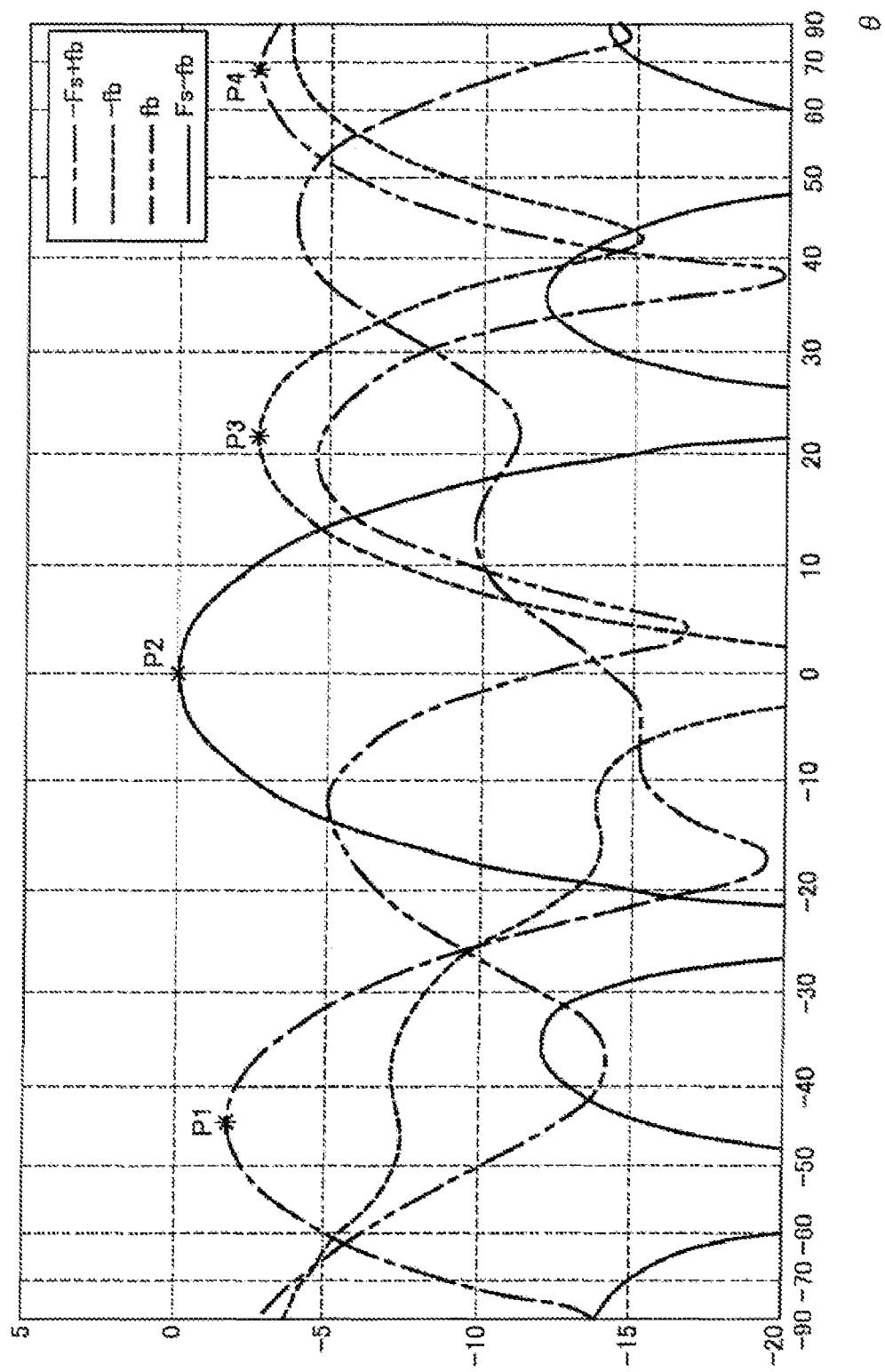
FIG. 10 is a view showing peaks of respective azimuths concerning the frequency candidates before aliasing.
Figure 11:
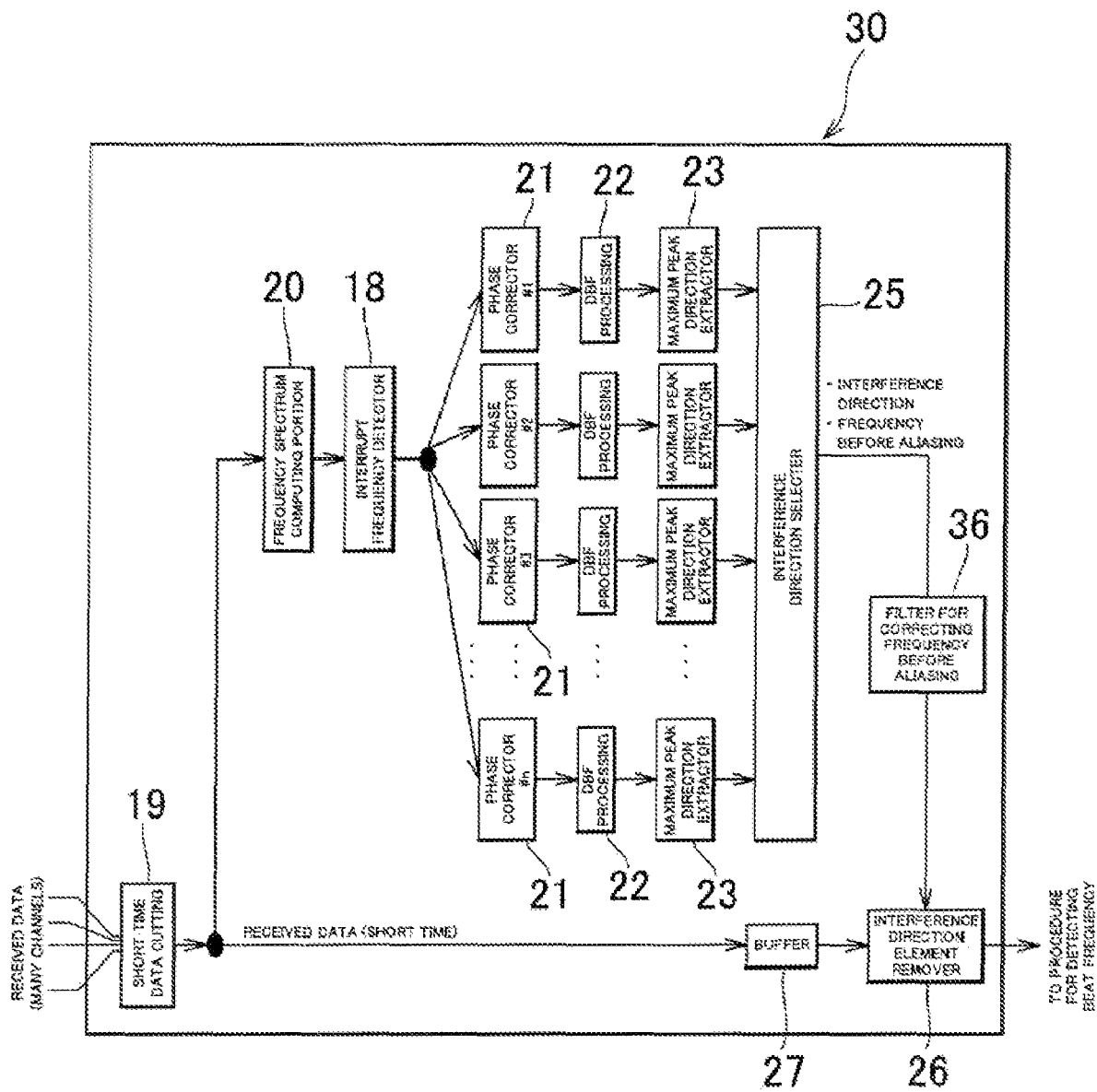
FIG. 11 is a view showing another embodiment of the electronic scanning radar apparatus.
Figure 12:
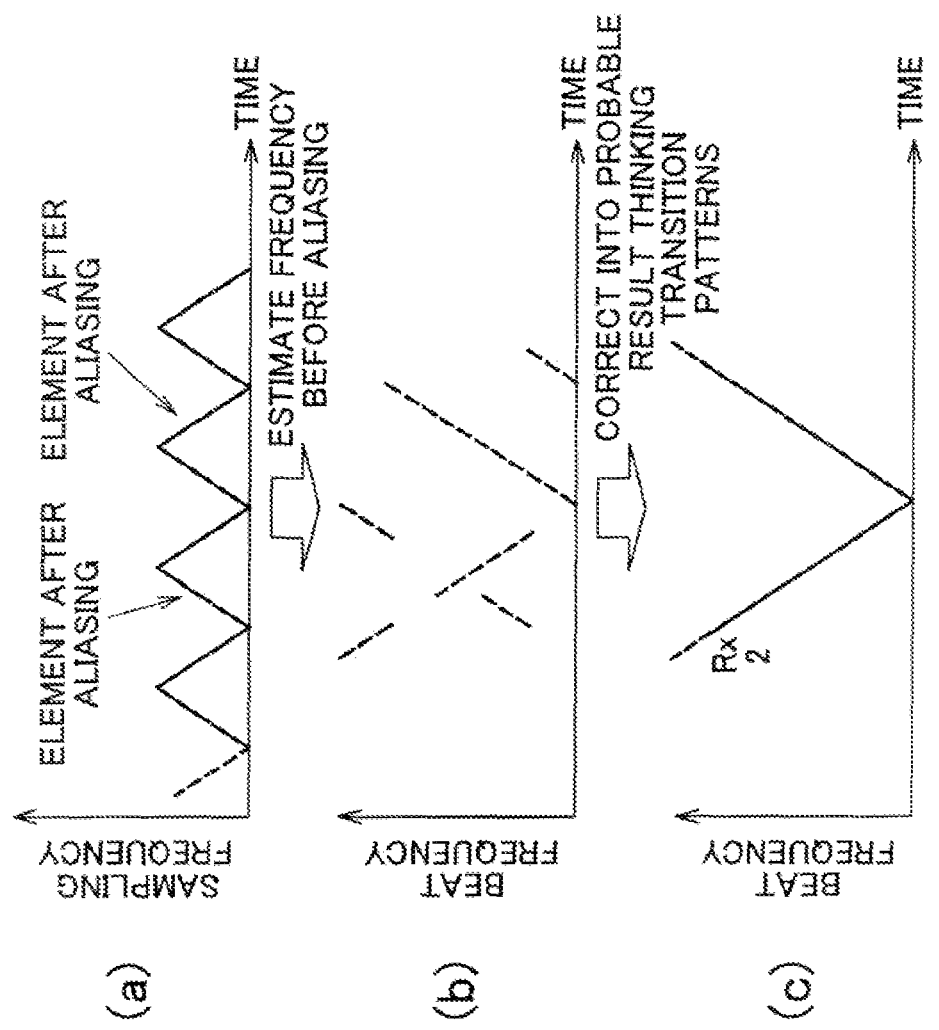
FIG. 12 is a view for explaining estimation of the interference signal by applying transition patterns on the basis of estimated frequency candidates before aliasing.
Figure 13:
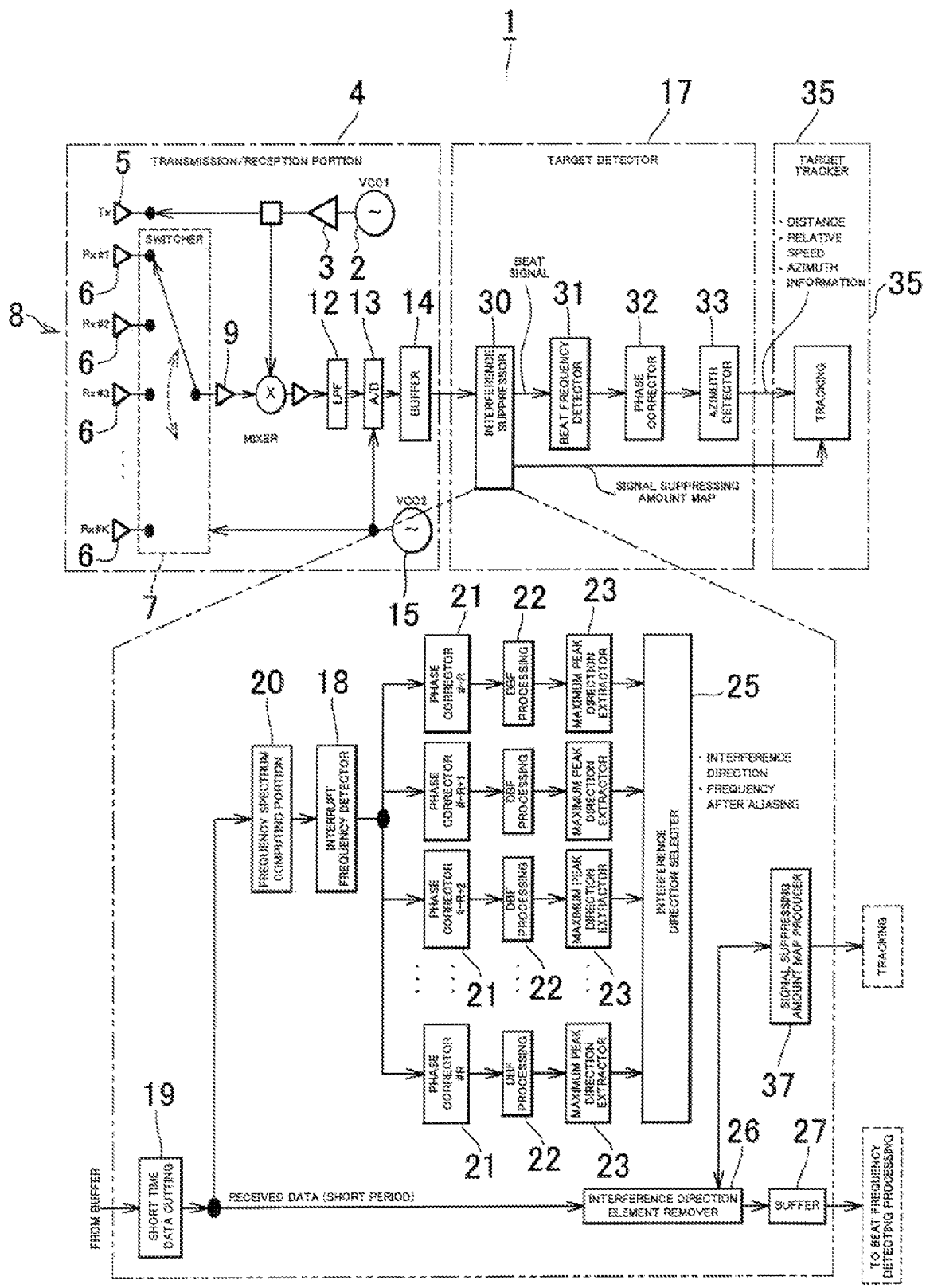
FIG. 13 is a view showing another embodiment of the electronic scanning radar apparatus.
Figure 14:
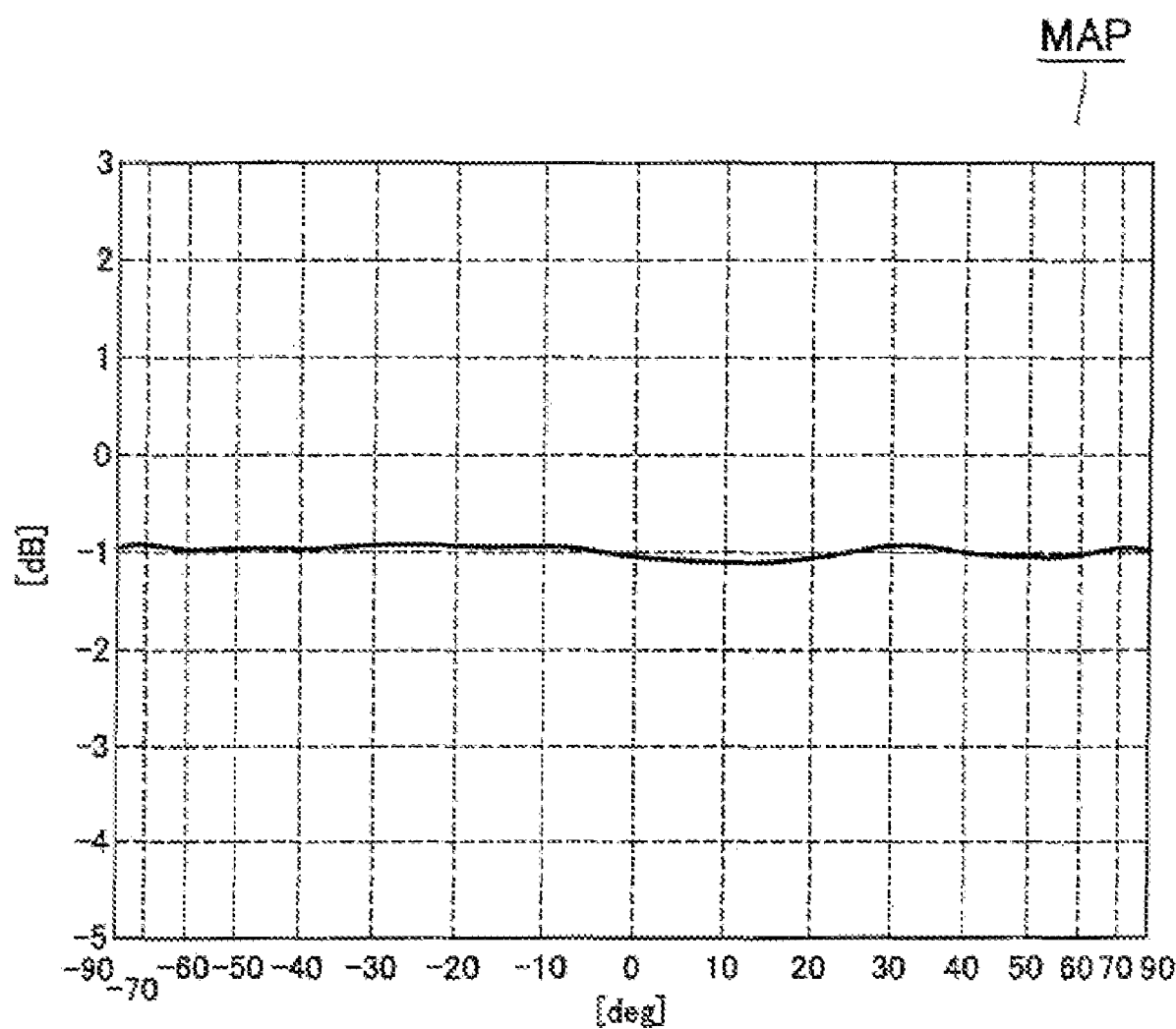
FIG. 14 is a view showing an instance of a signal suppressing amount map.

FIG. 5 is a block diagram showing one embodiment of the electronic scanning radar apparatus according to the invention, FIG. 6 is a typical view showing cutting of short time data, FIG. 7 is a typical view showing computing of a frequency spectrum, FIG. 8 is a typical view showing an instantaneous beat frequency of an interference signal in each time, FIG. 9 is a typical view showing frequency candidates before aliasing which is generated from the instantaneous beat frequency, FIG. 10 is a view showing peaks of respective azimuths concerning the frequency candidates before aliasing, FIG. 11 is a view showing another embodiment of the electronic scanning radar apparatus, FIG. 12 is a view for explaining estimation of the interference signal by applying transition patterns on the basis of estimated frequency candidates before aliasing, FIG. 13 is a view showing another embodiment of the electronic scanning radar apparatus, and FIG. 14 is a view showing an instance of a signal suppressing amount map.

FIG. 5 is a block diagram showing an electronic scanning radar apparatus 1 which is an embodiment of the invention. This radar apparatus 1 is a FM-CW radar apparatus wherein a transmitted signal Tx which is obtained by executing frequency modulation (FM) on continuous wave (CW) is used. And, the radar apparatus is a DBF radar apparatus for executing Digital Beamforming in a reception array antenna 8. This radar apparatus 1 is a so-called on-vehicle radar apparatus which is provided on a vehicle, and detects a distance to a vehicle (target) traveling in a forward direction, and its relative speed. The result detected by the radar apparatus 1 is used for control information in a vehicle traveling. Microwaves are used as transmission waves.

This radar apparatus 1 has only one set of analogue device, such as a RF amplifier 9 and a mixer 10, in the whole structure by utilizing the switcher 7. The radar apparatus 1 has a transmitter/receiver 4, and the transmitter/receiver 4 has an oscillator 2 which center frequency is f0 (such as 76 GHz), an amplifier 3 and a transmission antenna 5. The oscillator 2 outputs a signal which is obtained by multiplying a carrier wave of a frequency f0 by a triangular modulation of a frequency modulation width ΔF, that is a modulated wave (transmission signal Tx) of a frequency f0±ΔF/2 by a control voltage which is outputted from a direct current for modulation (not shown). The modulated waves are amplified by the amplifier 3, and are emitted from the transmission antenna 5 as electromagnetic waves. A part of the transmission signals Tx is outputted in the mixer 10 as local signals for detecting waves on reception side. The transmission antenna 5 is comprised of four element antennas, for instance, in order to have a desired directivity in a horizontal direction.

The reception array antenna 8 which is provided at the transmitter/receiver 4 has "K" number of array antenna components 6 which correspond to first channel (#1) through K-th channel (#K), the array elements 6 being linearly arranged at equal intervals. Each antenna component 6 is comprised of two element antennas, and has a directivity which is fixed in a horizontal direction, similar to the transmission antenna 13. The switcher 7 has "K" number of input terminals and one output terminal, and each array antenna component 6 of the array antenna 8 is connected with each input terminal. The output terminal is connected with any one of the input terminals, and the connection is periodically switched by a switching signal (a clock signal). The connection is electronically switched on a circuit.

A received signal Rx is time divided and is multiplexed by the switcher 7 at a cycle of 1/fsw. Order of switching is random. If the reception antenna is comprised of the array antenna components 6 having five channels, which are arranged at equal intervals, for instance, the switching may not be in the arrangement order, starting from an edge, such as 1ch→5ch→4ch→2ch→3ch. The time divided multiplexed signal is amplified by the RF amplifier 9, and the amplified and the transmitted signal Tx distributed by the mixer 10 are mixed with each other. The received signal Rx is down converted by this mixing, and the beat signal S3 which is a difference signal between the transmitted signal Tx and the received signal Rx is generated as shown in FIG. 1(b). The processing of obtaining the beat signal S3 on the basis of the received signal Rx and the transmitted signal Tx is a known art, which is disclosed in the Japanese patent application publication number of which is H11-133142, for instance. So, the details is omitted to be explained in the specification.

In a FM-CW system with triangle wave modulation, the following expressions are satisfied $$fb1=fr-fd$$ [Expression 2]

$$fb2=fr+fd$$ [Expression 3]

where fr denotes beat frequency when relative speed is zero, fd denotes Doppler Frequency on the basis of relative speed, fb1 denotes beat frequency in a section where frequency increases (up section) and fb2 denotes best frequency in a section where frequency decreases (down section).

If the beat frequencies fb1 and fb2 in the up section and the down section in the modulation cycle are separately measured, fr and fd can be obtained from the following expression 4 and 5.

$$fr=(fb1+fb2)/2$$ [Expression 4]

$$fd=(fb2-fb1)/2$$ [Expression 5]

If fr and fd are fixed, distance R and speed V of the target can be obtained by the following expressions 6 and 7.

$$R=(C/(4 \cdot \Delta F \cdot fm)) \cdot fr$$ [Expression 6]

$$V=(C/(2 \cdot f0)) \cdot fd$$ [Expression 7]

where c denotes light speed and fm denotes FM modulation frequency.

The generated beat signal S3 is sampled and quantized as N number of data with sampling frequency fs by the A/D converter 13 via an amplifier 11 and a low-pass filter 12. The sampled and quantized is stored in a buffer 14 as "K (channels)×N number of received data DT1 as shown by the following Expression, and is outputted in a target detector 17.

[Expression 8]

$$\begin{pmatrix} x[1][1] & \cdots & x[1][N] \\ \vdots & \ddots & \vdots \\ x[K][1] & \cdots & x[K][N] \end{pmatrix} \quad (8)$$

The target detector 17 has an interference suppressor 30, a beat frequency detector 31, a phase corrector 32, an azimuth detector 33, as shown in FIG. 5, and the interference suppressor 30 has a short time data cutting 19, a frequency spectrum computing portion 20, an interference frequency detector 18, a phase corrector 21, a DBF (Digital Beamforming) processing 22, a maximum peak direction extractor 23, an interference direction selecter 25, and an interference direction element remover 26 and a buffer 27.

As shown in FIG. 6, the short time data cutting 19 cuts N number of received data RD stored in a time direction into M number of short data SD as shown in the following expression for each channel corresponding to each array antenna element 6.

[Expression 9]

$$\begin{pmatrix} x[k][1] & \cdots & x[k][t] & \cdots & x[k][N-M+1] \\ x[k][2] & \cdots & x[k][t+1] & \cdots & x[k][N-M+2] \\ \vdots & \ddots & \vdots & \ddots & \vdots \\ x[k][M] & \cdots & x[k][t+M-1] & \cdots & x[k][N] \end{pmatrix} \quad (9)$$

$$k = 1 \ldots K$$
$$t = 1 \ldots N-M+1$$

Subsequently, the frequency spectrum computing portion 20 executes a Discrete Fourier Transform on the data cut out in a short time as shown in FIG. 7 and Expression 10, and converts the data into data to frequency domain so as to compute a frequency spectrum.

[Expression 10]

$$(Y[k][1](f) \ldots Y[k][t](f) \ldots Y[k][N-M+1](f)) \quad (10)$$

The interference frequency detector 18 obtains an average between K channels of power after Discrete Fourier Transform, and detects a peak in the frequency direction, and obtains the frequency wherein an average power level at its peak is maximum as an instantaneous beat frequency of an interference element at each time t (interference element frequency) as shown in FIG. 8. This is represented by the following expression.

[Expression 11]

$$f_{BA}[t], (t=1 \ldots N-M+1) \quad (11)$$

[Expression 12]

$$f_{BA}[t] = \underset{f}{\mathrm{argmax}} \left( \frac{1}{K} \sum_{k=1}^{K} |Y[k][t](f)|^2 \right), t = 1 \ldots N-M+1 \quad (12)$$

The phase corrector 21 produces two or more candidates of a beat frequency before aliasing $f_{BA}$ of the interference element from an instantaneous beat frequency of the interference element $f_{BA}[t]$, as shown in FIG. 9.

[Expression 13]

$$f_{BB}[t][2p+q] = p \cdot F_S + (-1)^q \cdot f_{BA}[t]$$

wherein $$p = 0, \pm 1, \pm 2, \ldots \pm p_{MAX}$$

$$q = 0, 1 \quad (13)$$

$P_{MAX}$ is determined from the highest beat frequency which is supposed to be one before aliasing. Furthermore, a phase correcting amount $\Delta \phi$ corresponding to each instantaneous beat frequency before aliasing is computed and produced from two or more candidates of the instantaneous beat frequency before aliasing $f_{BB}$.

[Expression 14]

$$\Delta\phi[k][t][2p+q] = 2 \cdot \pi \cdot f_{BB}[t][2p+q] \cdot \tau[k] \quad (14)$$

With the two or more phase correcting amount $\Delta\phi$, the phase is corrected on a corresponding interference element beat frequency $f_{BA}$ of the data after Fourier Transform in a short time. The data after Fourier Transform in a short time after the phase correcting is expressed by $Y_C$.

[Expression 15]

$$Y_C[k][t][2p+q] = Y[k][t](f_{BA}[t]) \cdot \exp(-j \cdot 2 \cdot \pi \cdot \Delta\phi[k][t][2p+q]) \quad (15)$$

Subsequently, the DBF processing 22 executes a well-known DBF (Digital Beamforming) on the data after Fourier Transform in a short time $Y_C$ after phase correction. Details for DBF processing is disclosed in the reference 1.

[Expression 16]

$$Z[t][2p+q](\theta) = \left| \sum_{k=1}^{K} w_k(\theta) \cdot Y_C[k][t][2p+q] \right|^2 \quad (16)$$

wherein $\theta$ represents an azimuth for DBF scanning. Under such a situation that the channels are switched at random as mentioned before, a correlation between the candidate on which correction is not properly executed and a steering vector is low. On the contrary, the correlation between the candidate on which correction is properly executed and the steering vector is high, so that it can be expected that an energy in the interference direction is the maximum. Then, the beat frequency and the direction in the interference can be determined from the candidate wherein the peak after DBF is the maximum.

Thereafter, the maximum peak direction extractor 23 detects peak maximum values P1, P2, P3 and P4 in the azimuth direction for each of two or more candidates of the frequency before aliasing as shown in FIG. 10.

[Expression 17]

$$\theta_{PK}[t][2p+q] = \underset{\theta}{\mathrm{argmax}}(Z[t][2p+q](\theta)) \quad (17)$$

Subsequently, the interference direction selecter 25 selects the candidate number which peak level is the highest of two or more candidates of the frequency before aliasing as shown in FIG. 10 (P2 in case of FIG. 10). And, from the candidate number, an arrival azimuth $\theta T[t]$ of the interference element and the beat frequency before aliasing $f_{BT}[t]$ of the interference element are estimated.

[Expression 18]

$$r[t] = \underset{2p+q}{\max}(Z[t][2p+q](\theta_{PK}[t][2p+q])) \quad (18)$$
$$\theta_T[t] = \theta_{PK}[t][r[t]]$$
$$f_{BT}[t] = f_{BB}[t][r[t]]$$

The interference direction element remover 26 produces a projection matrix for suppressing the following interference element from the detected arrival azimuth of the interference element for each time.

[Expression 19]

$$P[t] = I - h[t] \cdot h[t]^H \quad (19)$$

wherein

[Expression 20]

$$h[t] = \begin{pmatrix} w_1(\theta_T[t]) \cdot \exp(-j \cdot 2 \cdot \pi \cdot f_{BT}[t] \cdot \tau[1]) \\ w_2(\theta_T[t]) \cdot \exp(-j \cdot 2 \cdot \pi \cdot f_{BT}[t] \cdot \tau[2]) \\ \vdots \\ w_K(\theta_T[t]) \cdot \exp(-j \cdot 2 \cdot \pi \cdot f_{BT}[t] \cdot \tau[K]) \end{pmatrix} \quad (20)$$

Then, the interference element can be suppressed by applying this expression to the original received data SD which has been cut out into the short time data outputted from the short time data cutting 19 (see FIG. 6).

[Expression 21]

$$x_C[t] = \begin{pmatrix} x_C[1][t] \\ \vdots \\ x_C[K][t] \end{pmatrix} = P[t] \cdot \begin{pmatrix} x[1][t] \\ \vdots \\ x[K][t] \end{pmatrix} \quad (21)$$

The buffer 27 stores the number of the original data of the short time data SD wherein the interference signal element has been suppressed, that is, xc[t], and the short time data cutting 19 cuts the stored data, the interference direction element remover 26 restores the short time data SD which interference direction element has been suppressed and removed into the received data RD, DT1 before the cutting (see FIG. 6), and sends the restored to the beat frequency detector 17 in the latter step. In the afore-mentioned state, the signal wherein the interference element has been removed (suppressed) is properly outputted from the beat signal stored in the buffer 14 of the transmitter/receiver 5 in FIG. 5 into the beat frequency detector 31 in the latter step.

Then, well-known procedures are executed on the beat signal wherein the interference element has been suppressed by the interference suppressor 30 of the target detector 17 in the beat frequency detector 31, the phase corrector 32 and the azimuth detector 33, and the distance between one's own vehicle and a target, such as a precedent vehicle, the relative speed and the azimuth are computed. Furthermore, the target tracker 35 as shown in FIG. 5, executes operational procedures, such as detection of the preceding vehicle by a time tracking. The detailed procedure is in the target tracker 35 is a known art, which is disclosed in the Japanese patent application publication number of which is 2003-270341, for instance. So, the details is omitted to be explained in the specification. Besides, the procedures in the beat frequency detector 31, the phase corrector 32 and the azimuth detector 33 are well-known methods, which are detailedly mentioned in the reference 1. So, the details is also omitted to be explained in the specification.

This embodiment is explained supposing that these processing portions and the operation contents thereof are actualized by a signal processing software to be operated through a micro processor or a digital signal processor. But, these processings can be also actualized with an integrated circuit on a semiconductor device, such as FPGA and LSI.

In the before-mentioned embodiment, the respective processing portions comprising the interference suppressor 30 have the following functions. That is, A) the short time data cutting 19 cuts many channels of data received from the buffer in the former step into two or more channels of short time data.

B) The frequency spectrum computing portion 20 computes the short time frequency spectrum from the short time data.

C) The interference frequency electronic detector 18 detects the interference element frequency from the short time frequency spectrum.

D) The phase corrector 21 supposes two or more frequencies before aliasing from the detected interference element frequency, and executes phase correction on each frequency before aliasing.

E) Two or more DBF processings 22 execute the DBF (Digital Beamforming) on the data after phase correction.

F) Two or more maximum peak direction extractor 23 extracts a peak in the azimuth direction from the result of the DBF processing, and extracts the azimuth having the maximum power level and its peak level.

G) The interference direction selecter 25 selects a peak azimuth/peak power having the maximum peak power of two or more, and detects the interference azimuth with the azimuth corresponding to the selected peak.

H) The interference direction element suppressor 26 applies a filter for suppressing the element in the azimuth direction from two or more channels of short time data on the basis of the elected interference direction.

I) The buffer 27 merges two or more channels of short time data after suppressing the interference element and restore into one having the original data length.

Although the interference element frequency fluctuates with time when receiving FM-CW radar of CW radar from an opponent vehicle as interference radar, the interference radar is cut out into the short time data in the structure of this embodiment, so that the frequency does not almost change in the bounds of the cut time. Accordingly, the frequency spectrum computing portion 20 and the interference frequency detector 18 can detect the interference element frequency in the time section.

Furthermore, a proper interference azimuth can be detected also on the frequency having aliasing since the most probable azimuth is selected out of two or more possible candidates and is determined as the interference direction by taking all possible frequencies before aliasing of the frequencies after aliasing into consideration so as to execute "phase correction" and "DBF processing" thereon and by extracting its maximum peak in this structure of this embodiment.

And, it is possible to actualize the interference suppressing processing with the interference azimuth even in the time-division reception type of radar by the structure having mechanism for removing interference direction elements from the interference azimuth and for merging the short time data.

FIG. 11 shows another instance of the interference suppressor 30 in the radar apparatus. In FIG. 11, the same reference number is attached to one the same as each of the portions in the interference suppressor 30 in FIG. 5, so that its explanation on the portion is omitted. And, the other structure excluding the interference suppressor 30 in the radar apparatus is the same as the care of FIG. 5.

The radar apparatus 1 of FIG. 1 is a structure adding a transition correction filter 36 to the radar apparatus 1 of FIG. 5. The transition correction filter 36 stores in advance transition pattern PAT1, PAT2, PAT3 of the beat frequency of the interference wave element which may occur at the time of mixing with the interference wave in the mixer 10 as shown in FIG. 12(*d*), and properly correct the beat frequency before aliasing which has been estimated by the interference direction selector 25 by comparing these transition patterns PAT1, PAT2, PAT3 and the beat frequency before aliasing of the interference element which has been estimated by the interference direction selecter 25.

In the case of FIG. 12 for instance, the result of the estimated frequency before aliasing which has been detected by the interference direction selecter 25 includes an error due to fluctuations, such as noise, as shown in FIG. 12(b). Then, the proper transition pattern is selected in such a manner that possible transition patterns PAT1, PAT2, PAT3 which have been computed in advance and stored in a proper memory are applied to the output from this selecter, and to which transition pattern this is applied is judged by selecting the pattern having the most matching candidates, that is, by selecting the pattern with decision by majority. Thereafter, the result which does not correspond to the selected pattern is corrected according to the selected transition pattern. In the case of FIG. 12, the original pattern is judged to be the frequency pattern as shown by the pattern PT2 since many estimated results match with the pattern PT2. Furthermore, the estimated result which do not match with the line of the pattern PT2 is corrected so as to match with the pattern PT2, and the beat frequency which is considered to be most correct as the interference wave is determined as shown in FIG. 12(c). And, the interference is suppressed as mentioned before, making use of the estimated result of the beat frequency before aliasing and the estimated result of the interference azimuth as shown in FIG. 12(c).

In case of FIG. 11, the buffer 27 is provided just before the interference direction element remover 26, which is different from the case of FIG. 5. This is because the interference direction element remover 26 removes the interference direction element on the received data SD which have been cut in the short time data of FIG. 6 for two or more (K) channels in the case of FIG. 5, but the buffer 27 stores the short time data SD for the number of the original data and the interference direction element remover 26 removes the interference direction element on the signal which has been restored into two or more (K) channels of the received data DT1 before cutting (see FIG. 6) in the case of the embodiment of FIG. 11.

Even if there is an error in the beat frequency before aliasing due to fluctuations, such as noise, a corresponding transition pattern is thus selected by applying two or more transition patterns as the candidates of the frequency before aliasing, and parts which does not applied to the selected transition pattern is corrected, thereby improving the accuracy of detecting the azimuth on a weak interference element which is easy to receive influence of fluctuations of noise, and removing the weak interference element.

FIG. 13 shows another embodiment of the radar apparatus. In FIG. 13, the same reference number is attached to one the same as each of the portions in FIG. 5, so that its explanation on the portion is omitted. In this embodiment, a signal suppressing amount map producer 37 is added to the apparatus of FIG. 5. A signal suppressing amount map produced by the signal suppressing amount map producer 37 is outputted to the target tracker 35.

Operations excluding the signal suppressing amount map producer 37 are similar to the apparatus of FIG. 5. Then, the operations in the signal suppressing amount map producer 37 are mainly explained. From the interference direction obtained by the interference direction selecter 25, a signal suppressing amount map MAP which is dependent on the next azimuth beat frequency is computed.

[Expression 22]

$$\text{Loss}(\theta, f_B) = \frac{1}{N} \cdot \sum_{i=1}^{N} \left| P[t] \cdot \begin{pmatrix} \exp(j \cdot 2 \cdot \pi \cdot f_B \cdot \tau[1]) & & 0 \\ & \ddots & \\ 0 & & \exp(j \cdot 2 \cdot \pi \cdot f_B \cdot \tau[K]) \end{pmatrix} \cdot \frac{w(\theta)}{|w(\theta)|} \right|^2 \quad (22)$$

wherein $$w(\theta) = ( w_1(\theta) \quad w_2(\theta) \quad \ldots \quad w_K(\theta) )^H$$

FIG. 14 shows the signal suppressing amount map MAP in case of fb=100 kHz, that is, Loss (θ, 100 kHz). This signal suppressing map is inputted into the target tracker 35 in the latter step. In the tracking in the latter step, the credibility on detection of a target is computed, making use of the power at the time of the target detection. On this occasion, a desired signal element below the interference element of the beat signal also lowers due to the removing of the interference direction element by the interference suppressor, in addition to the interference element. The lowered amount is computed and grasped with the suppressing amount map MAP computed herein and correction is executed, so that more correct tracking is possible.

A degree of lowering of the signal can be grasped and corrected by the target tracker 35 since in this structure, the signal suppressing amount map MAP is produced in order to grasp the amount of the signal suppression on the original received signal Rx which suppression should be executed contingent to the suppressing of the interference signal element, and the map is inputted into the tracking and used (corrected). For this reason, the target can be tracked without lost thereof.

The invention can be also applied to a CW type of electronic scanning radar apparatus in addition to a FM-CW type of electronic scanning radar apparatus.

The invention can be utilized for a FM-CW type or a CW type of electronic scanning radar apparatus for use on vehicle.

The present invention has been explained on the basis of the example embodiments discussed. Although some variations have been mentioned, the embodiments which are described in the specification are illustrated and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. Electronic scanning radar apparatus, having
   a transmission antenna for ejecting a transmitted signal which is comprised of a continuous wave;
   a reception antenna which is comprised of two or more antenna components;
   a mixer for mixing a received signal received by each of said two or more antenna components and said transmitted signal and for obtaining beat signals for two or more channels corresponding to said two or more antenna components;
   a switcher provided between said mixer and said two or more antenna components, for selectively connecting said two or more antenna components with said mixer;
   an A/D converter for sampling said beat signal obtained by said mixer with a predetermined sampling frequency and for obtaining received data respectively corresponding to said two or more antenna components for two or more channels; and a target detector for detecting distance and relative speed of a target on the basis of said receiving data for said two or more channels which is sampled by said A/D converter, said electronic scanning radar apparatus, comprising:

a short time data cutter for cutting said sampled received data for two or more channels into two or more short time data in a time direction for each channel;

a frequency spectrum computing portion for computing frequency spectra of said two or more short time data for each said channel;

an interference frequency detector for detecting an interference element frequency of an interference wave from said frequency spectra;

two or more phase correctors, each corrector for producing two or more candidates of a frequency before aliasing of said interference wave from said interference element frequency of said interference wave, and for computing phase correcting amount for each candidate, and for correcting phase on said interference element frequency on the basis of said phase correcting amount;

two or more maximum peak direction extractors, each extractor for executing Digital Beamforming processing on said interference element frequency after respective phase corrections, and for extracting the maximum peak in an electric power of an azimuth direction on said each frequency candidate;

an interference direction selecter for selecting said frequency candidate showing the maximum peak power of the maximum peaks of said respective frequency candidates, and for estimating an arrival azimuth of said interference element from said azimuth of said maximum peak power of said selected frequency candidate;

an interference direction element remover for applying a filter for suppressing said interference element to said short time data cut out by said short time data cutting in said estimated arrival azimuth of said interference element so as to suppress said interference element; and a buffer for merging said short time data wherein said interference element has been suppressed and for restoring to data having length before cutting;

whereby distance and relative speed of said target are detected on the basis of said restored data.

2. Electronic scanning radar apparatus, having a transmission antenna for ejecting a transmitted signal which is comprised of a continuous wave;

a reception antenna which is comprised of two or more antenna components;

a mixer for mixing a received signal received by each of said two or more antenna components and said transmitted signal and for obtaining beat signals for two or more channels corresponding to said two or more antenna components;

a switcher provided between said mixer and said two or more antenna components, for selectively connecting said two or more antenna components with said mixer;

an A/D converter for sampling said beat signal obtained by said mixer with a predetermined sampling frequency and for obtaining received data respectively corresponding to said two or more antenna components for two or more channels; and a target detector for detecting distance and relative speed of a target on the basis of said receiving data for said two or more channels which is sampled by said A/D converter, said electronic scanning radar apparatus, comprising:

a short time data cutter for cutting said sampled received data for two or more channels into two or more short time data in a time direction for each channel;

a frequency spectrum computing portion for computing frequency spectra of said two or more short time data for each said channel;

an interference frequency detector for detecting an interference element frequency of an interference wave from said frequency spectra;

two or more phase correctors, each corrector for producing two or more candidates of a frequency before aliasing of said interference wave from said interference element frequency of said interference wave, and for computing phase correcting amount for each candidate, and for correcting phase on said interference element frequency on the basis of said phase correcting amount;

two or more maximum peak direction extractors, each extractor for executing Digital Beamforming processing on said interference element frequency after respective phase corrections, and for extracting the maximum peak in an electric power of an azimuth direction on said each frequency candidate;

an interference direction selecter for selecting said frequency candidate showing the maximum peak power of the maximum peaks of said respective frequency candidates, and for estimating an arrival azimuth of said interference element from said azimuth of said maximum peak power of said selected frequency candidate;

a memory for storing in advance two or more transition patterns of said beat frequency of said interference element which may occur at the time of mixing with said interference wave in said mixer;

a filter for correcting frequency before aliasing, for comparing said frequency before aliasing of said interference wave estimated by said interference direction selecter and said two or more transition patterns in said memory so as to judge to which transition pattern of these transition patterns said estimated frequency before aliasing of said interference wave can be applied and for selecting the pattern, and correcting an estimated result of said frequency before aliasing of said interference wave on the basis of said selected transition pattern, and for outputting said result; and an interference direction element remover for applying a filter for suppressing said interference element to said sampled received data for said two or more channels on the basis of said arrival azimuth of said estimated interference element and said estimated result of said corrected frequency before aliasing of said interference wave outputted from said transition correcting filter so as to suppress said interference element of said received data.

3. The electronic scanning radar apparatus according to claim 1, further comprising a signal suppressing amount map producer for computing and outputting lowered amount of said beat signal excluding said interference element suppressed by said filter in said interference direction element remover on the basis of said arrival azimuth of said interference element estimated by said interference direction selecter as a signal suppressing amount map.

* * * * *